United States Patent [19]
Walker

[11] 3,974,685
[45] Aug. 17, 1976

[54] TIGHTENING SYSTEM AND METHOD

[75] Inventor: Richard A. Walker, Warrington, Pa.

[73] Assignee: Standard Pressed Steel Co., Jenkintown, Pa.

[22] Filed: Sept. 19, 1974

[21] Appl. No.: 507,547

[52] U.S. Cl. ............................... 73/88 F; 173/12
[51] Int. Cl.² ....................................... G01L 5/24
[58] Field of Search ............... 73/88 F, 139; 173/12; 235/151.3; 81/52.4

[56] References Cited
UNITED STATES PATENTS

| | | | |
|---|---|---|---|
| 2,651,196 | 9/1953 | Pinkel | 73/88 F UX |
| 3,194,105 | 7/1965 | Gill | 73/88 F UX |
| 3,354,705 | 11/1967 | Dyer, Jr. | 73/88 F UX |
| 3,851,386 | 12/1974 | Ellzey, Jr. | 73/88 F X |

*Primary Examiner*—Jerry W. Myracle
*Attorney, Agent, or Firm*—Andrew L. Ney; Robert P. Seitter; Aaron Nerenberg

[57] ABSTRACT

A tightening system and method and a fastener assembly usable therewith are disclosed in this specification. According to the method a fastener assembly is provided that causes a change in the slope of the torque-rotation curve which could be plotted while the joint is being tightened, which change occurs at a known load. While tightening the joint, the torque applied to the fastener assembly when the slope of the torque-rotation curve changes is noted and is used to calculate the torque necessary to induce a desired load in the joint. Additional torque is applied to the fastener until the actual torque being applied substantially equals the calculated torque. The tightening system includes a wrench for tightening the joint and a control system associated with the wrench including a system responsive to the change in slope of the torque-rotation curve for calculating the torque corresponding to the desired load to be induced in the fastener assembly and for shutting off the tool when the actual torque corresponds to the calculated torque.

In accordance with the preferred embodiment disclosed herein, the fastener assembly includes a washer member which is seated between the bearing surface of the rotating fastener member and the outer surface of one of the structural members comprising the joint assembly. The washer member includes a bearing pad projecting above one of the main bearing surfaces of the washer member and located at the mean diameter thereof. As the fastener assembly is tightened, the bearing pad is deformed at a predetermined load temporarily changing the slope of the torque-rotation curve which is sensed by the tool as noted above.

13 Claims, 7 Drawing Figures

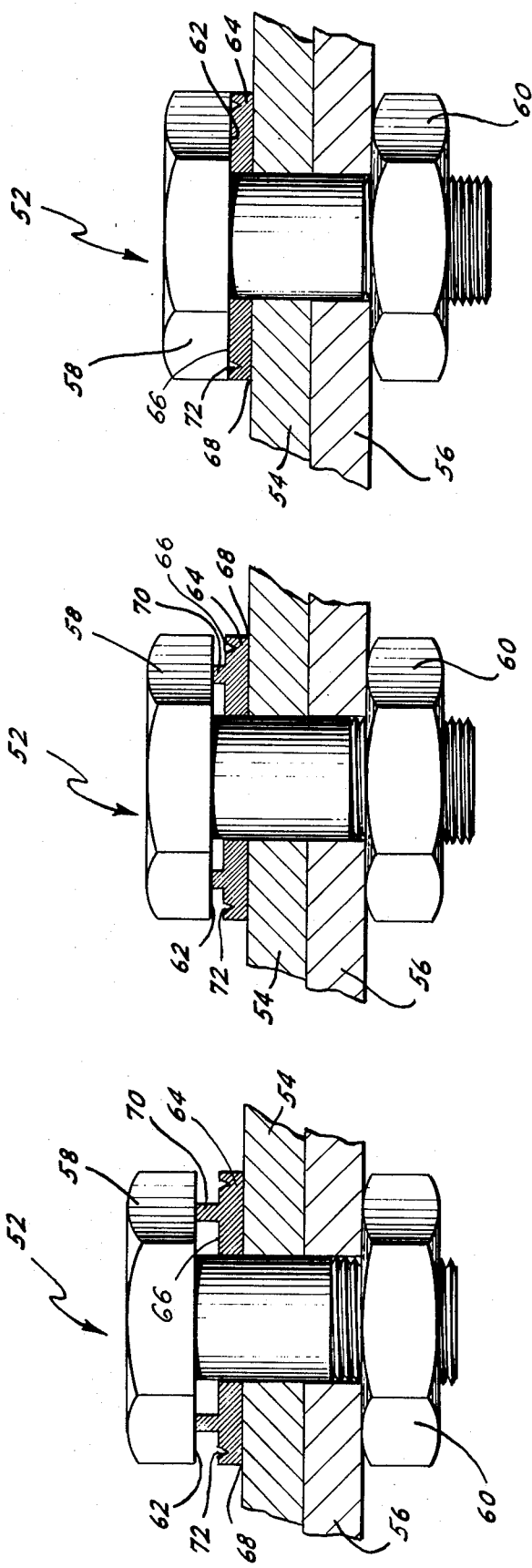

TIGHTENING SYSTEM AND METHOD

This invention relates generally to a method and apparatus for tightening fasteners to a desired axial load and to fastener assemblies particularly usable with the apparatus in carrying out the method.

In the design of structural joints secured by mechanical fastener systems, it is usual to provide for the fasteners to exert a predetermined clamping force or load on the structural members to insure the integrity of the joint. When the joints are assembled, therefore, it is desirable that the fasteners be tightened to exert a predetermined axial load on the associated structural members. However, prior art tightening techniques for tightening threaded fasteners such as nuts and bolts to exert a predetermined load on associated structural members are not entirely satisfactory. For example, the most accurate tightening technique involves a measurement of the axial strain or stretch of the bolt while it is being tightened and relating the stretch to the stress or axial load acting on the bolt through previously calculated stress-strain relationships. While most accurate, practical applications do not usually permit measurement of the stretch of the bolt and, in those instances where the stretch can be measured, it is a time consuming and relatively expensive technique. Accordingly, this technique is used in relatively few applications outside of laboratory testing.

Another known tightening technique and that most commonly used in most joint assembly operations involves the use of torque controlled tools, that is, tools that indicate when the torque applied to the fastener equals or exceeds a predetermined torque and stop tightening the fastener in response thereto. Torque measurement is relatively easy and since torque is related to the axial force induced in the fastener, and exerted on the structural members, the predetermined torque can be selected to theoretically correspond to the predetermined clamp load specified for the joint. However, when tightening threaded fasteners in assembly line operations, wide variations in the actual torque-load relationships are experienced. These variations are caused by a variety of factors including allowable tolerance variations in the dimensions and strength of the fasteners and structural members and lubrication or absence thereof on the mating surfaces of the fasteners and/or the structural members, all of which, in turn cause large variations in the coefficient of friction between the mating surfaces of the joint. In actual practice, variations of up to ± 30% of the axial load on the bolts used for a particular application can be experienced at the same torque level. Accordingly, the torque control technique is not very accurate.

It is an object of this invention, therefore, to provide a tightening system and method for tightening a fastener to a desired load.

It is another object of this invention to provide a tightening system and method usable with a fastener assembly including a member having a predetermined configuration for tightening a fastener to a desired load without use of any other predetermined relationships.

It is still another object of this invention to provide a fastener assembly which is deformable at a predetermined load and which does not significantly alter the frictional characteristic of the fastener assembly after its deformation.

Finally, it is an object of this invention to provide a tightening system and method that is versatile, reliable, economical and accurate, as well as a fastener assembly having the same properties.

These and other objects of this invention are accomplished by providing a fastener assembly that causes a change in the slope of the torque-rotation curve which could be plotted for the fastener assembly when it is being tightened at a known load. When the slope of the torque-rotation curve is changed, the torque at which the change occurred is noted and is used along with the known load to calculate the torque corresponding to the desired load. Thereafter, additional torque is applied to the fastener assembly until the torque being applied substantially equals the calculated torque.

For carrying out the above noted method, a tightening system is provided which includes a wrench for rotating a fastener member and applying torque thereto and which is associated with suitable means for measuring the instantaneous torque being applied to the fastener and for developing a signal representative thereof. Also associated with the wrench is means for developing a signal representative of the gradient or slope of the torque-rotation curve which could be plotted for the particular fastener being tightened which signal is processed by suitable detecting means determining when the change in slope of the torque-rotation curve has occurred and then developing a detection signal. The detection signal actuates a control means calculating the torque corresponding to the desired load to which the fastener should be tightened and thereafter developing a control signal when the actual torque applied to the fastener equals the calculated torque.

A fastener assembly usable with the tightening system described above includes a washer in the form of an annular member having opposite bearing surfaces one of which is formed with an axially projecting bearing pad located at its mean diameter.

Preferably, the bearing pad is adjacent the bearing surface of one of a pair of cooperating threaded fastener members used to secure the structural members forming the joint. As the fastener assembly is tightened, the bearing surface of the one fastener member exerts an axial load on the pad causing the pad to deform at a predetermined load which also causes a temporary change in the slope of the torque-rotation curve which can be detected by the detecting means in the tool. Since the bearing pad is located at the mean diameter of the annular member, the friction characteristic between the washer and the one fastener member is not significantly changed.

For a better understanding of the invention, reference is made to the following description of a preferred embodiment taken in conjunction with the figures of the accompanying drawing, in which.

Figure 1:
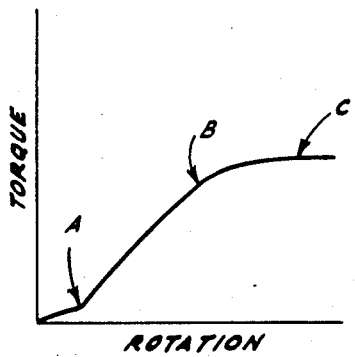
FIG. 1 is a plot of a curve illustrating the characteristics of a typical torque-rotation relationship experienced by a conventional fastener during a tightening cycle.

Referring to FIG. 1, there is illustrated a typical torque-rotation curve for a threaded fastener being tightened with the torque plotted along the vertical axis and with the angular displacement or rotation plotted along the horizontal axis. The curve includes an initial or pretightening region extending from the intersection of the torque and rotation axes to point A. In the pretightening region, mating threads of the fastener assembly have been engaged and one of the fasteners is being rotated, but the bearing face of the rotating fastener has not contacted the adjacent face of the structural member included in the joint. At point A on the curve the structural members have been pulled together by the fastener assembly and actual tightening of the joint commences. In the art, the torque at point A is commonly referred to as the "snug" torque. In the tightening region of the curve, extending from point A to point B, axial force is developed in the fastener assembly members which is exerted on the structural members as the clamping force. In this region, the curve is generally linear. At point B, the limit of proportionality of the joint assembly has been exceeded and the rotation of the fastener member starts increasing at a faster rate than the torque. For purposes of this application, point B will be considered as the start of the yield region, but it will be understood that beyond point B, load will still be induced in the joint assembly but at a non-linear rate of increase. Point C corresponds to the yield point of the joint assembly and while the definition of yield point varies slightly, can be considered to be the point beyond which strain or stretch of the bolt is no longer purely elastic.

Figure 2:
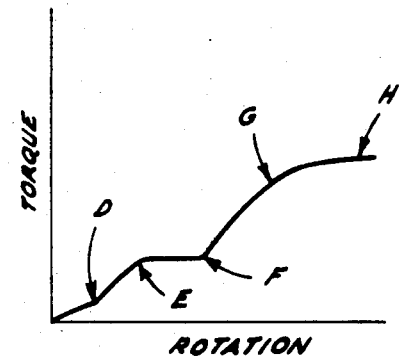
FIG. 2 is a plot of a curve illustrating the characteristics of a torque-rotation relationship experienced by a fastener assembly in accordance with this invention and illustrating an underlying principle of a tightening system and method in accordance with this invention.

Referring now to FIG. 2, a torque-rotation curve for a fastener assembly is illustrated wherein the fastener assembly includes a configuration that temporarily changes the slope of the linear region of the torque-rotation curve illustrated in FIG. 1 at a predetermined load and which would exhibit a linear characteristic after the configuration has been altered and until the limit of proportionality has been reached. Thus, the curve illustrated in FIG. 2 includes an initial or pretightening region similar to that illustrated in FIG. 1 and which extends from the intersection of the torque and rotation axes to point D. At point D, the structural members have been pulled together by the fastener assembly and actual tightening of the joint commences and the curve is generally linear. Point D corresponds to point A on the curve illustrated in FIG. 1. As load is induced in the fastener assembly its configuration causes the slope of the curve to decrease significantly as indicated from Point E to point F, the former representing the start of the change and the latter representing the end of the change. After the change in slope has been completed the curve again assumes its linear configuration to point G, the limit of proportionality of the joint assembly. Point G corresponds to point B on the curve illustrated in FIG. 1 and is the transition point to the yield region of the curve. Point H, similar to point C in FIG. 1, corresponds to the yield point of the joint assembly. Thus it can be seen that a fastener assembly following this curve develops a false or pseudo yield region, points E to F, in the normally linear portion of the torque-rotation curve.

Figure 3:
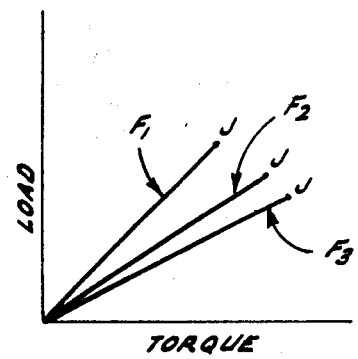
FIG. 3 is a plot of a curve illustrating the characteristics of a typical load-torque relationship experienced by a fastener during a tightening cycle and illustrating another underlying principle of this invention.

Referring now to FIG. 3, there is illustrated a plot of the relationship between the axial load on the fastener members and the torque being applied to the fastener assembly, the load being plotted on the vertical axis and the torque being plotted on the horizontal axis. It can be seen that the relationship is generally linear to the yield point J and it is noted that for any particular fastener the exact relationship varies according to the coefficient of friction between the fastener and its mating surfaces. Accordingly, a particular fastener may experience any number of load-torque relationships as illustrated on the drawing by curves $F_1$, $F_2$, and $F_3$ and that at any given torque, the load varies significantly depending on the coefficient of friction. During the following explanation of the invention, reference will be made to FIGS. 2 and 3 and the significance of the various relationships will be explained.

Figure 4:
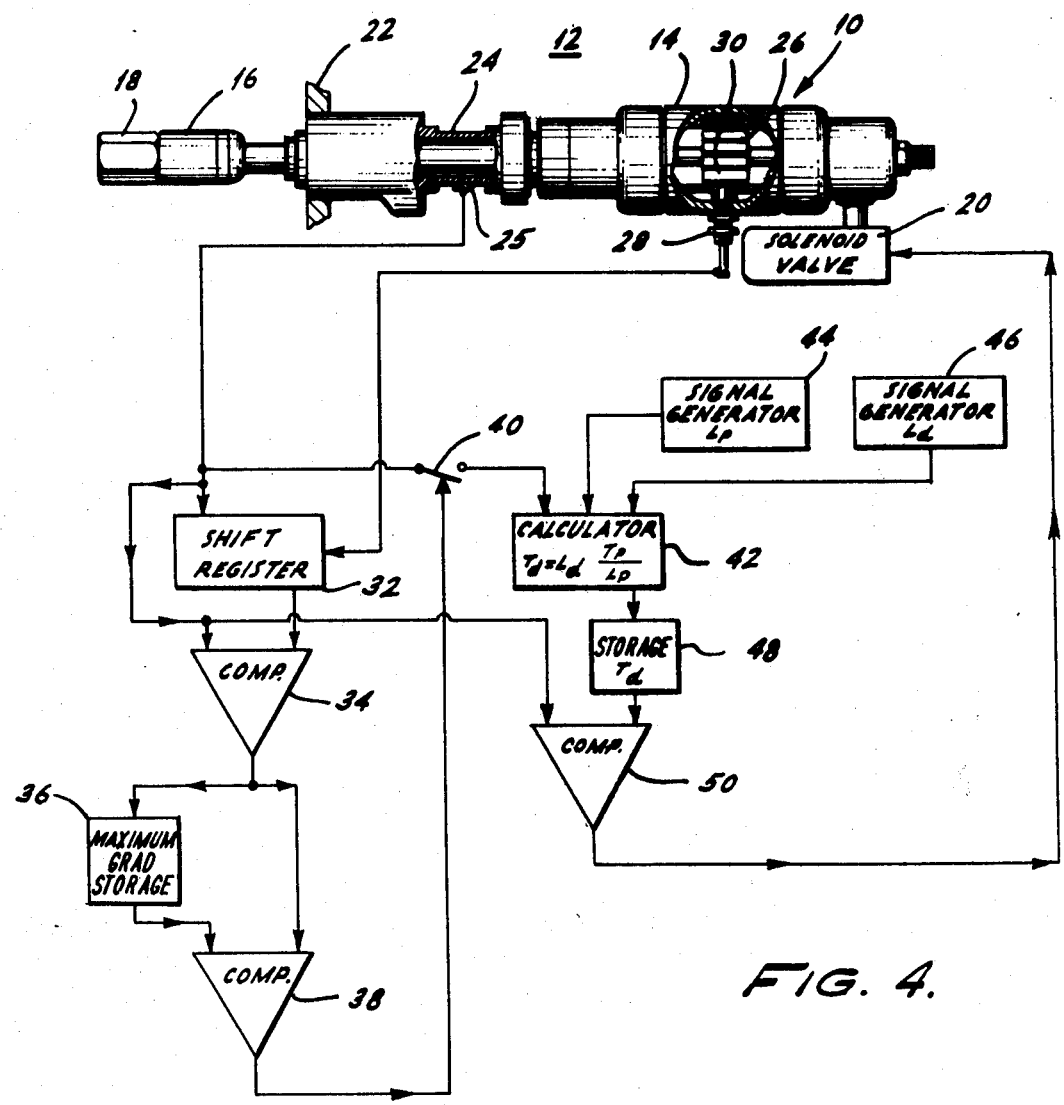
FIG. 4 is a schematic drawing of a tightening system in accordance with this invention; and, FIGS. 5 through 7 are sectional views of a fastener assembly in accordance with this invention and illustrating various configurations of the fastener assembly during a tightening cycle.

Referring now to FIG. 4, there is illustrated a tightening system 10 in accordance with this invention. Tightening system 10 includes a wrench 12 having a motor 14, an output drive shaft 16 and drive bit 18. Drive shaft 16 is driven by motor 14 to apply torque and impart rotation to a fastener member engaged by driver bit 18. Wrench 12 can be of any conventional type and as is most common, motor 14 can be air powered with the flow of motive fluid being controlled by a suitable electrically operated control valve 20. It should be understood that motor 14 could also be electric, hydraulic or any combination of pneumatic, hydraulic or electric. The exact details of the wrench are not necessary for a proper understanding of the invention and, accordingly, a more specific description is not provided.

Mounted between the housing of motor 14 and a rigid frame 22 on which the wrench is carried, is a suitable transducer or torque cell 24 for generating a varying signal representative of the instantaneous torque being applied to the fastener. Torque cell 24 can be any of a variety of conventional devices and in the embodiment disclosed herein comprises a somewhat flexible annular member having strain gauges 25 secured to its outer periphery so that the reaction torque on the wrench is measured and an electric signal representative of the torque is generated. The reaction torque is, of course, equal to and opposite the torque being applied to the fastener. Mounted on drive shaft 16 for rotation therewith and preferably within motor 14, is a suitable encoder 26 that cooperates with a proximity detector 28 for developing signals representative of the incremental angular displacement or rotation of the fastener. Encoder 26 can be any of the variety of suitable devices and in this embodiment includes a series of teeth 30 formed on its outer periphery. Proximity detector 28 senses the presence of metal and, thus, the passage of the teeth and develops electric signals representative of predetermined increments of angular rotation. While examples of torque and rotation measuring devices have been described, it should be understood that any of a variety of devices for accomplishing the noted result can be utilized with the invention.

A control circuit is operatively associated with wrench 12 for controlling the tightening of the fastener and includes a gradient calculating system that determines the instantaneous gradient or slope of the torque-rotation curve which could be plotted for the particular fastener being tightened and develops an electric signal representative thereof. The gradient calculating system comprises a shift register 32 to which the instantaneous torque signal is fed and whose output is clocked by the rotation signal at fixed increments of angular rotation. Accordingly, the output of shift register 32 is a signal representative of torque a predetermined number of degrees of rotation previous to the instantaneous rotation. A comparator 34 in the form of a suitable subtraction circuit receives the output of shift register 32 and also the signal representative of instantaneous torque and provides an output signal representative of the difference. Since torque signals are subtracted over fixed increments of rotation, the output signal from comparator 34 is representative of the instantaneous gradient of the torque-rotation curve through which the fastener is being tightened.

At this point, it should be noted that while the torque-rotation curve is generally linear from points A to B, D to E and F to G, it may not be exactly linear and, further, that temporary spikes may be included in the curve for any particular fastener which are caused by temporary acceleration caused by lack of or excessive lubricant, respectively, on a particular place on the threads. Thus, the output of comparator 34 which would be a signal of constant magnitude if the torque-rotation curve were exactly linear from the noted points may experience certain changes. For this reason the gradient calculating system may include circuits for determining and storing the maximum gradient experienced up to any point along the torque-rotation curve, that is, up to any point in the tightening cycle. In effect, the maximum gradient experienced in the generally linear region of the curve is considered the gradient for that region of the curve. Accordingly, a storage circuit 36 is provided which stores a signal representative of the maximum gradient and compares instantaneous gradient signals with the maximum, stored signal. If an instantaneous gradient signal is larger than a stored gradient signal, the instantaneous gradient signal is then stored for comparison with instantaneous gradient signals. For a more complete description of storage circuit 36, reference is made to co-pending application Serial No. 507,417 filed by John T. Boys on Sept. 19, 1974 for Apparatus For and Method of Determining Rotational Linear Stiffness which application is a continuation-in-part of application Ser. No. 357,920 filed May 7, 1973, now abandoned for Apparatus For and Method of Determining Rotational or Linear Stiffness by John T. Boys.

As also explained in the above-noted co-pending application, when tightening conventional fasteners, the instantaneous torque gradient is related to the maximum torque gradient such that the former is approximately 50% of the latter at the yield point of the fastener. This relationship is more generally described as being within the range of approximately 25% to 75% at the yield point of the fastener. Similarly, for fasteners having the torque-rotation relationship illustrated in FIG. 2 of the drawing, the instantaneous gradient in the false yield region extending from points E to F is also about 50% of the maximum gradient of the initial linear region extending from points D to E. By utilizing a comparator circuit 38 the instantaneous gradient signal from comparator 34 can be compared with the maximum gradient signal from storage circuit 36 and when the former is 50% or less than the latter comparator circuit 38 can output a detection signal representative of the fastener assembly having been tightened to a predetermined load.

Before proceeding with a further explanation of the invention, reference is again made to FIGS. 2 and 3. In FIG. 3, it can be seen that the load-torque relationship is generally linear to the yield point and that if the coefficient of friction between the mating surfaces of the fastener is known, the relationship can be used with accuracy to tighten the fastener. Thus, the uncertainty in tightening the fastener with load-torque relationships revolves about the variations in the coefficient of friction or exact curve being followed, that is, curve $F_1$, $F_2$, or $F_3$. It should be clear, however, that if a point can be determined along the load-torque curve, the exact relationship or curve being followed can be determined. Thus, if a fastener assembly is utilized that exhibits a torque-rotation relationship as illustrated in FIG. 2, and if the load and torque at which the torque-rotation curve flattens are determined, it is possible to determine the exact curve, $F_1$, $F_2$ or $F_3$ which the fastener assembly is following. The method according to this invention involves providing a fastener assembly that follows the torque-rotation relationship illustrated in FIG. 2 of the drawing and which develops the false yield condition at a known predetermined load. As the fastener assembly is tightened the false yield condition is detected and the torque at which the false yield condition occurred is noted. Since the load at which the false yield condition occured is known from the design of the fastener assembly, one point on the load-torque curve is known and, in effect, the exact curve being followed is known. Since the load-torque relationship for any curve $F_1$, $F_2$, or $F_3$ is linear, a proportion as follows is evident:

$$\frac{T_d}{L_d} = \frac{T_p}{L_p}$$

In the above equation, $L_d$ represents the desired load to which the fastener should be tightened and, of course, is known; $T_d$ represents the torque required to induce the desired load in the fastener; $L_p$ represents the load at which the false yield condition occurred and is also known because of the design of the fastener assembly; and $T_p$ represents the torque at which the false yield condition occurred and can be determined as the fastener is tightened. Now, the above equation can easily be solved for $T_d$ as follows:

$$T_d = L_d \frac{T_p}{L_p}$$

The tightening of the fastener assembly continues until the torque value for $T_d$ is applied to the fastener at which value the desired load is induced in the fastener assembly and is acting on the structural members comprising the joint assembly.

Accordingly, when comparator 38 detects the false yield condition of the fastener assembly being tightened and outputs the detection signal, that signal closes a switch member 40 connecting a circuit between torque cell 24 and a calculator circuit 42. Accordingly, calculator circuit 42 receives a signal representative of the instantaneous torque being applied to the fastener assembly. Calculator circuit 42 includes suitable multiplication and division circuits and also receives inputs from a first signal generator 44 whose output is a signal representative of the load at which the false yield condition was developed. This value, as noted above, is known beforehand and is set into signal generator 44. Another input to calculating circuit 42 is from a second signal generator 46 whose output is a signal representative of the desired load to which the fastener should be tightened. Again, signal generator 46 can be set before operation of the tool to develop the appropriate signal. In accordance with the equation set out above, calculator circuit 42 calculates $T_d$ and develops a signal representative thereof and feeds that signal to a storage circuit 48. The signal from storage circuit 48 is fed to a comparator 50 which also receives an instantaneous torque signal from torque cell 24 as the tightening cycle continues. Compartor 50 is operative to compare the two signals by subtracting one from the other and when the signals are equal, to output a control signal to control valve 20 for shutting off motor 14 and stopping the tightening cycle. When motor 14 is shut off, of course, the desired load is acting on the joint assembly.

As noted above, a tightening system and method in accordance with this invention utilizes a fastener assembly capable of developing a false yield in the torque-rotation curve at a predetermined load. Any of a variety of suitable assemblies can be utilized for this purpose, for example, a belleville washer under the head of a bolt can be utilized and when the washer snaps over center, at a known load, the torque-rotation curve will temporarily flatten. Of importance to the accuracy of the system and method in accordance with this invention is the requirement that the fastener assembly have essentially the same frictional characteristics after its configuration has been altered that it had before its configuration has been altered. According to another aspect of this invention, such an assembly is disclosed. Referring to FIGS. 5 through 7, a joint assembly 52 is illustrated and includes a pair of structural members 54 and 56 and a suitable bolt member 58 cooperating with a nut member 60 to secure the structural members together. Interposed between the bearing surface 62 of bolt member 58 and the outer surface of structural member 54 is a washer 64 whose configuration is altered during the tightening cycle to develop the false yield portion of the torque-rotation curve as illustrated in FIG. 2. Washer 64 includes a pair of opposite bearing faces 66 and 68, the former being adjacent bearing surface 62 of bolt member 58 and the latter being adjacent the outer surface of structural member 54. Formed on bearing surface 66 is an axially projecting bearing pad 70 which extends above bearing surface 66 and into engagement with bearing surface 62 of bolt member 58. Radially adjacent pad 70, bearing face 66 is formed with a groove 72 the purpose of which will be explained hereinafter. It should be noted that pad 70 is located at the mean diameter of both washer 64 and bearing surface 62 of bolt member 58.

FIG. 5 illustrates the relationship of the various parts of the joint assembly prior to its tightening. Referring to FIGS. 6 and 7, it can be seen that as the fastener is tightened, bearing surface 62 of bolt member 58 engages the top surface on pad 70 exerting a force on the pad which acts through the mean diameter of both the bolt and the washer member. Eventually, sufficient force is developed to deform pad 70 causing the pad to collapse toward bearing surface 66 of washer 64. The material of pad 70 flows radially into groove 72 so that the groove acts as a relief area for the material. Eventually, as illustrated in FIG. 7, the height of pad 70 will have been reduced such that it is even with bearing surface 66. It will be noted that in this condition, the force developed between bolt member 58 and washer 64 still acts through the mean diameter of those members. Because of this relationship, the friction characteristics between the bolt and the washer will not be altered significantly and the moment arm through which the force is acting will not change so that the load-torque relationship remains essentially the same after collapse of pad 70 as it was beforehand. It is also noted that pad 70 collapses at a predetermined load dependent on the washer material and its strength, the cross-sectional area of the pad and its height above bearing surface 66. Finally, it should be noted that as the pad deforms it develops the false yield region of the torque-rotation curve as illustrated in FIG. 2, that is the region from points E to F.

Various coatings could be applied to the bearing face 62 of bolt member 58 and/or bearing surface 66 of washer 64 including pad 70 to provide a more uniform coefficient of friction. The coating material utilized, however, should not be of the brittle type since deformation of pad 70 could cause cracking which would alter the frictional characteristics of the mating surfaces in the region of the cracks. Examples of suitable coatings include cadmium, Teflon, and phosphorous and oil.

While in the foregoing there have been described preferred embodiments of a tightening method and system for practicing that method and further, a fastener assembly usable with the tightening system to practice the method, various changes and modifications should be obvious to one skilled in the art and are within the intended scope of the invention as recited in the appended claims.

I claim:

1. A method for tightening a fastener assembly to a desired load, said method comprising:
    tightening the fastener assembly to a predetermined load characterized by a known structural condition of the fastener assembly by applying torque thereto;
    determining the torque applied to the fastener assembly at the predetermined load;
    calculating the torque required to tighten the fastener assembly to the desired load by utilizing the determined torque and predetermined load; and,
    tightening the fastener assembly to the calculated torque.

2. A method in accordance with claim 1 wherein said fastener assembly includes a configuration which is altered at a predetermined load and wherein the torque is determined when the configuration is altered.

3. A method in accordance with claim 1 wherein said fastener assembly includes a configuration which temporarily changes the slope of the torque-rotation curve which could be plotted for the fastener being tightened and wherein the torque is determined when the slope changes.

4. A method for tightening a fastener assembly to a desired load, said method comprising:
    providing a fastener assembly having a configuration temporarily changing the slope of the torque-rotation curve which could be plotted for the fastener assembly when subjected to a predetermined load;

tightening said fastener assembly by applying torque thereto and determining the torque being applied when the slope of the torque-rotation curve changes;

calculating the torque required to tighten said fastener assembly to the desired load using the predetermined load and determined torque; and, stopping the tightening of said fastener assembly when the actual torque being applied equals the calculated torque.

5. A tightening system for tightening a fastener assembly to a desired load, said system comprising:

a wrench for tightening said fastener assembly by applying torque thereto;

measuring means associated with said wrench for developing a signal representative of the instantaneous torque being applied to said fastener assembly;

gradient calculating means responsive to said instantaneous torque signal for developing a gradient signal representative of the slope of a torque-rotation curve which could be plotted for the fastener assembly being tightened;

control means responsive to a significant change in said gradient signal for calculating the torque required to tighten said fastener assembly to the desired load to be induced in said fastener assembly.

6. A tightening system in accordance with claim 5 wherein said control means further includes means for developing a control signal when the actual torque being applied to said fastener assembly equals said calculated torque.

7. A tightening system in accordance with claim 5 wherein said control means receives an instantaneous torque signal when said gradient signal changes significantly.

8. A tightening system in accordance with claim 7 wherein said control means receives signals representative of the load on said fastener assembly and of the desired load when said gradient signal changes significantly.

9. A tightening system in accordance with claim 5 wherein said system further includes comparator means for determining when said gradient signal changes significantly and for developing a detection signal which activates said control means.

10. A tightening system in accordance with claim 9 wherein said detection signal is developed when the instantaneous gradient signal has a predetermined relationship with the maximum gradient signal developed.

11. A tightening system in accordance with claim 9 wherein said detection signal is developed when the instantaneous gradient signal is 50% or less of the maximum gradient signal developed.

12. A tightening system in accordance with claim 9 wherein said detection signal is developed when the instantaneous gradient signal is in a range of approximately 25% to 75% of the maximum gradient signal developed.

13. A tightening system in accordance with claim 5 wherein said fastener assembly includes a configuration significantly changing said gradient signal at a predetermined load.

* * * * *